UNITED STATES PATENT OFFICE.

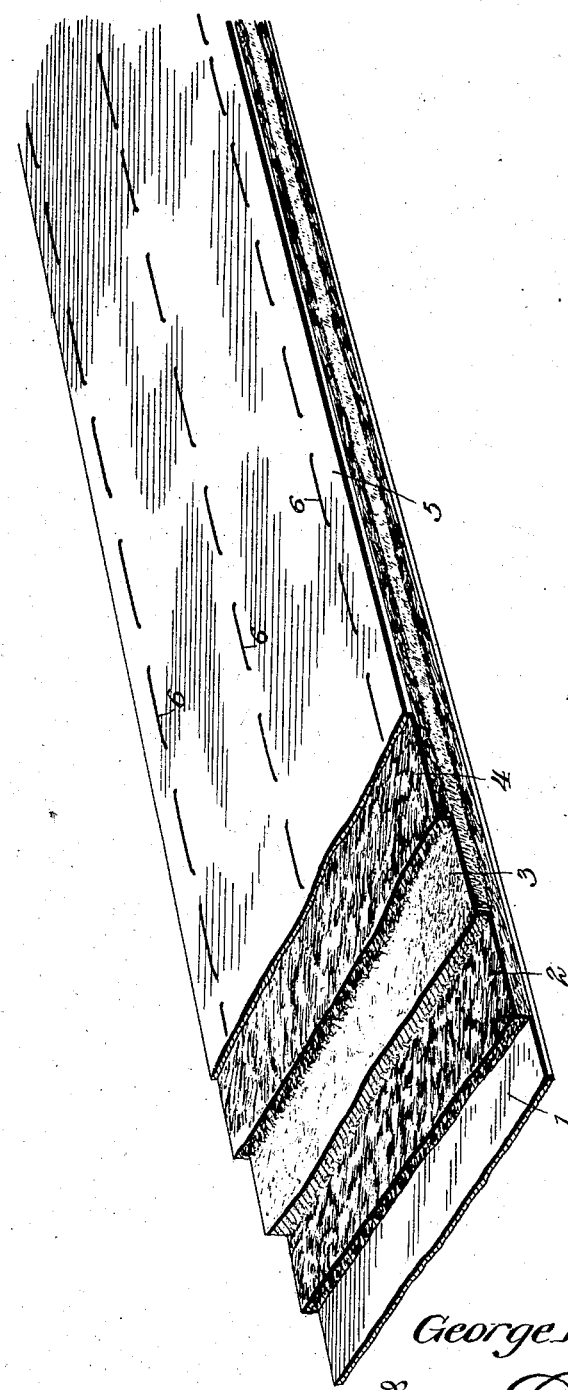

GEORGE KELLY, OF MINERALPOINT, WISCONSIN.

COMPOSITE INSULATING MATERIAL.

SPECIFICATION forming part of Letters Patent No. 683,208, dated September 24, 1901.

Application filed June 25, 1901. Serial No. 65,981. (No specimens.)

*To all whom it may concern:*

Be it known that I, GEORGE KELLY, a citizen of the United States, residing at Mineralpoint, in the county of Iowa and State of Wisconsin, have invented a new and useful Composite Insulating Material, of which the following is a specification.

This invention relates to a novel composite material for insulating and other purposes. The object of the invention is to produce an inexpensive and completely non-conductive lining for floors, refrigerator-cars, and cold-storage apartments or to prevent the radiation of heat from heated surfaces, and this end is attained by combining a loose flax fiber (preferably purified) with a filler of mineral wool in a loose flocky condition. Both flax fiber and mineral wool are known to be excellent insulators; but the use of mineral wool for insulating purposes is limited by reason of its tendency to settle when placed in a perpendicular position—as, for instance, between walls. Besides being one of the best insulators known, if, indeed, it is not actually the best, it is inexpensive, being a by-product of iron smelting, and therefore the only drawback to its general use is the difficulty encountered in sustaining it in its proper position. Flax fiber, as already stated, is likewise an excellent insulator and has no tendency to settle or sag like mineral wool. Flax fiber, however, is comparatively expensive, and one of the prime requisites of a commercially successful insulator is cheapness. The present invention is therefore directed to the production of an insulating material which will be composed in a large part of the inexpensive mineral wool, but combined with flax fiber in a manner to cause the mineral wool to be sustained against that sagging or settling which has heretofore precluded the possibility of its use in many connections.

In the accompanying drawing I have shown a sheet of my insulating material with the several layers broken away for the purpose of clearly illustrating the structure.

In producing the material I first provide a sheet or layer of suitable flexible material—as, for instance, paper or cloth—which I shall designate as the "cover-sheet" 1, and upon this cover-sheet is spread a layer of loose flax fiber. The flax fiber may be utilized in its native condition, and, in fact, the use of such fiber is contemplated under certain conditions. By preference, however, the flax fiber employed in my insulating material is first purified to produce a cellulose fiber by any means known to those skilled in the art. The peculiarities of this cellulose fiber derived from the flax are its great strength and resiliency and its exceedingly light weight. This is owing to the fact that the fibers are of great length and strength and are of hollow cylindrical form, the treatment of the flax to produce the pure cellulose fiber serving to thoroughly remove the lignose, lignin, lignone, and lignireose as well as the gums and carbohydrate which incrust and impregnate the cell walls and interstices as well as the hollow inside of the tube of a raw or untreated flax fiber. The removal of these substances from the fiber greatly increases its non-conductivity, and each hollow cylindrical filament becomes an air-cell infinitesimally small, but constituting one of an innumerable number of air-cells present in the mass of fiber and serving to render the latter an excellent non-conductive material. This raw flax fiber or purified cellulose fiber, as the case may be, is, as stated, spread in a layer of the desired thickness upon the cover-sheet 1 and is indicated in the drawing by the numeral 2. Upon this layer of flax fiber is next imposed a layer 3 of mineral wool in a loose flocky condition. Upon this is imposed a second layer 4 of flax fiber, which latter is then covered with a second cover-sheet 5. The material thus formed is now subjected to sufficient pressure to secure the necessary interrelation of the alternate layers of flax fiber and mineral wool. It will be noted that the flax fibers are exceedingly long and that the fibers of the mineral wool are very short, and it is by reason of the peculiarities of these materials that they are especially adapted for combined use in the manner stated. In other words, these fibrous layers being composed, respectively, of long and short fibers become interlocked or interwoven with each other, the peculiar loose flocky condition of the mineral wool facilitating the penetration of its fibers into the fibrous layers of flax. The material having been built up of any desired number of alternate layers of flax and mineral wool, covered, as stated, with paper or other suitable cover-sheets, the insulating-felt thus produced is stitched through to insure the proper retention of its layers. The lines of stitching are preferably disposed longitudinally of the strip of felt or insulating material adjacent to the opposite longitudinal edges thereof, as shown in the drawing and indicated by the numeral 6.

It will now be seen that I have produced a novel insulating material composed in part of mineral wool sustained and augmented by raw or purified cellulose fiber and designed for use in the various connections wherein an insulating-felt is available. I desire to be understood, however, as reserving the right to effect such variations of the herein-described embodiment of the invention as may be properly comprehended within the scope of the protection prayed.

What I claim is—

1. A composite insulating material of the character described, composed of mineral wool and a sustaining-body of flax fiber.

2. A composite insulating material composed of layers of mineral wool and flax fiber in a loose, dry condition and in intimate relation.

3. A composite insulating material composed of alternate layers of mineral wool and flax fiber, and means for securing said layers in intimate relation.

4. A composite insulating material composed of alternate layers of mineral wool and flax fiber, and a flexible cover.

5. A composite insulating material composed of alternate layers of mineral wool and flax fiber, a flexible cover for said layers, and stitches passing through the several layers and cover.

6. A composite insulating material composed of alternate layers of mineral wool and flax fiber, from which fiber the gums and lignates have been removed.

7. A composite insulating material composed of mineral fiber and degummed and delignated cellulose fiber of flax.

8. A composite insulating material composed of alternate layers of mineral wool, degummed and delignated cellulose fiber of flax, a flexible cover for said layers, and stitches securing the layers and cover in intimate relation.

In testimony that I claim the foregoing as my own I have hereto affixed my signature in the presence of two witnesses.

GEORGE KELLY.

Witnesses:
PHILIP ALLEN, Jr.,
FRANK E. HANSCOM.